(12) United States Patent  (10) Patent No.: US 8,795,425 B2
Takaori et al.  (45) Date of Patent: Aug. 5, 2014

(54) INK FOR INK-JET RECORDING APPARATUSES AND IMAGE FORMING METHOD

(71) Applicant: KYOCERA Document Solutions Inc., Osaka (JP)

(72) Inventors: Yasuko Takaori, Osaka (JP); Noriaki Furukawa, Osaka (JP); Takashi Somete, Osaka (JP); Susumu Hiroshima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/777,712

(22) Filed: Feb. 26, 2013

(65) Prior Publication Data

US 2013/0222464 A1  Aug. 29, 2013

(30) Foreign Application Priority Data

Feb. 28, 2012  (JP) .................................. 2012-042482

(51) Int. Cl.
  *C09D 11/02*  (2014.01)
(52) U.S. Cl.
  USPC ...................................... 106/31.86; 347/100
(58) Field of Classification Search
  USPC ...................................... 106/31.86
  See application file for complete search history.

(56) References Cited

U.S. PATENT DOCUMENTS

| | | | |
|---|---|---|---|
| 5,976,233 A | 11/1999 | Osumi et al. | |
| 2012/0196966 A1* | 8/2012 | Ozawa et al. | 524/377 |
| 2013/0027485 A1* | 1/2013 | Ozawa | 347/100 |
| 2013/0127953 A1* | 5/2013 | Furukawa et al. | 347/68 |

FOREIGN PATENT DOCUMENTS

| | | |
|---|---|---|
| JP | H10-195360 A | 7/1998 |
| JP | 2004-182889 A | 7/2004 |
| JP | 2005-082607 A | 3/2005 |
| JP | 2010-000766 A | 1/2010 |
| JP | 2013-107944 A | 6/2013 |

* cited by examiner

*Primary Examiner* — Veronica F Faison
(74) *Attorney, Agent, or Firm* — Knobbe Martens Olson & Bear LLP

(57) ABSTRACT

An ink for ink-jet recording apparatuses, includes water, a pigment dispersion, and a super-penetrating agent and a high SP organic solvent respectively having a predetermined solubility parameter (SP value). All of differences ($\Delta$SPs) between SP values of the neighboring organic solvents are from 0.5 to 5.0 in order of SP values thereof, and the difference of $SP_{max}-SP_{min}$ is 12 or less in which $SP_{max}$ is the highest SP value of an organic solvent among organic solvents in the high SP organic solvent and $SP_{min}$ is the smallest SP value of an organic solvent among organic solvents in the super-penetrating agent.

8 Claims, 6 Drawing Sheets

INK FOR INK-JET RECORDING APPARATUSES AND IMAGE FORMING METHOD

INCORPORATION BY REFERENCE

This application is based upon and claims the benefit of priority from the corresponding Japanese Patent Application No. 2012-042482, filed in the Japan Patent Office on 28 Feb. 2012, the entire content of which is incorporated herein by reference.

FIELD

The present disclosure relates to an ink for ink-jet recording apparatuses and an image forming method.

BACKGROUND

In recent years, highly precise and fine image quality comparative to silver salt photography can be taken along with rapid progress of recording technology; therefore, ink-jet recording apparatuses for forming images using an ink-jet recording system have been widely used as image forming apparatuses.

Higher speed when forming images and improvement in toughness of obtained images are strongly desired for the ink-jet recording apparatuses. For the countermeasure, in some cases, pigment ink excellent in light resistance and water resistance compared to dye ink has also been used. However, there is a problem with the pigment ink in that ejection failure of the ink may occur when forming images after the ink has not been ejected from recording heads for a while as the pigment ink tends to thicken or solidify due to drying of the ink.

In order to solve the problem, surfactants or polymer dispersants as additives of the ink have been investigated from various aspects for the purpose of stabilizing ejection of the ink for ink-jet recording apparatuses. A water-based ink has also been proposed in which a hydrophilic group is introduced onto a surface of a pigment, for example, and thus the pigment can be stably dispersed in an aqueous medium without dispersant.

In the case of using such an ink, ink ejection is satisfactory when forming images after the ink has not been ejected from recording heads for a while. However, in cases of using recording heads having a small-sized nozzle with an aim to improve image quality, there arises a problem of occurrence of disarray in an ejecting direction of ink droplets; therefore, it is necessary to improve ejection stability of the ink.

Furthermore, when forming images using the pigment ink with ink-jet recording apparatuses, the ink tends to adhere to discharge rollers before the ink has penetrated into recording media when the recording media are discharged through a pair of discharge rollers (offset). In this case, image defects are likely to occur in obtained images due to adhesion to recording media of the ink which has adhered to the discharge rollers. For this reason, a penetrating agent to promote ink infiltration into recording media is often added to the ink in order to suppress occurrence of image defects due to the offset.

However, in cases of including the penetrating agent into the ink, there is also a problem in that colors of ink droplets ejected from recording heads, after the ink was not ejected from recording heads for a while, become lighter colors or transparent.

In this regard, the pigment ink without dispersant described above does not contain a so-called penetrating agent. Accordingly, the problem in that colors of ink droplets become lighter colors or transparent, ejected from recording heads after the ink was not ejected from recording heads for a while, has not been eliminated by using the pigment ink described above in cases of using the pigment ink containing the penetrating agent.

SUMMARY

An ink for ink-jet recording apparatuses according to a first aspect of the present disclosure includes at least water, a pigment dispersion, a super-penetrating agent, and a high SP organic solvent. The super-penetrating agent contains at least one compound selected from the group consisting of 1,2-hexylene glycol, 2,4-diethyl-1,5-pentanediol, 2-ethyl-1,3-hexanediol, and 2-butyl-2-ethyl-1,3-propanediol. The high SP organic solvent is an organic solvent having an SP value of 13 or greater and less than 23 and contains 1,3-propanediol and at least one organic solvent other than 1,3-propanediol. The content of 1,3-propanediol in the ink for ink-jet recording apparatuses is from 10% to 20% by mass based on the mass of the ink. All of ΔSPs which are differences between SP values of the neighboring organic solvents in order of SP values thereof are from 0.5 to 5.0. Difference of $SP_{max}-SP_{min}$ is 12 or less, in which $SP_{max}$ is the highest SP value of an organic solvent among organic solvents in the high SP organic solvent and $SP_{min}$ is the smallest SP value of an organic solvent among organic solvents in the super-penetrating agent.

In an image forming method according to another aspect of the present disclosure, images are formed using an ink-jet recording apparatus by using the ink for ink-jet recording apparatuses described above.

DETAILED DESCRIPTION

Figure 1:
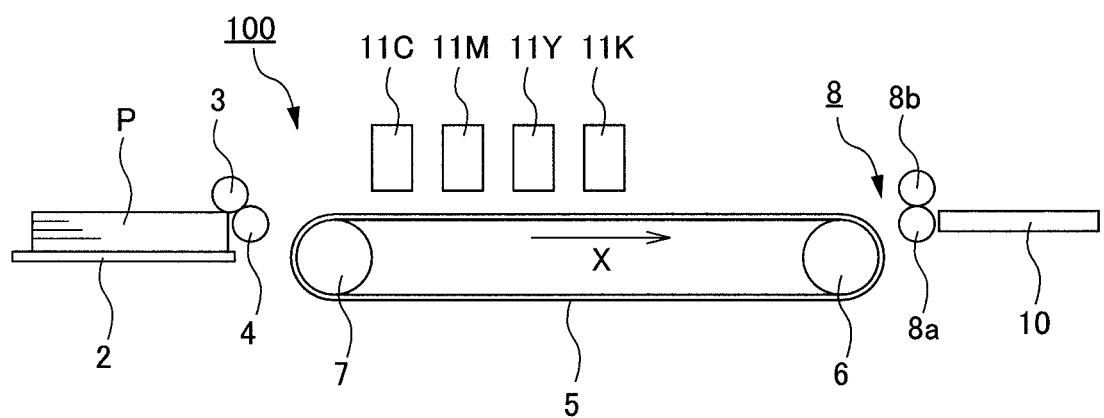
FIG. 1 shows a configuration of an ink-jet recording apparatus that employs a line head-type recording system.

The present disclosure is explained in detail with respect to embodiments below; however, the present disclosure is not limited at all to the embodiments below and may be carried out with appropriately making a change within the purpose of the present disclosure. In addition, explanation may be occasionally omitted with respect to duplicated matters; this does not however limit the gist of the present disclosure.

First Embodiment

An ink for ink-jet recording apparatuses of the first embodiment (hereinafter, also simply referred to as "ink") contains water, a pigment dispersion, a super-penetrating agent having a predetermined solubility parameter (hereinafter, also simply referred to as "SP value"), and an organic solvent with a high SP value (hereinafter, also simply referred to as "high SP organic solvent"). The super-penetrating agent contains at least one compound selected from the group consisting of 1,2-hexylene glycol, 2,4-diethyl-1,5-pentanediol, 2-ethyl-1,3-hexanediol, and 2-butyl-2-ethyl-1,3-propanediol. The high SP organic solvent contains 1,3-propanediol and at least one organic solvent other than 1,3-propanediol. All of ISPs which are differences between SP values of the neighboring organic solvents in order of SP values thereof are from 0.5 to 5.0. Difference of $SP_{max}-SP_{min}$ is 12 or less, in which $SP_{max}$ is the highest SP value of an organic solvent among organic solvents in the high SP organic solvent and $SP_{min}$ is the smallest SP value of an organic solvent among organic solvents in the super-penetrating agent.

The SP value, the water, the pigment dispersion, pigment and resin in the pigment dispersion, the super-penetrating agent, and the high SP organic solvent, which are essential components in the ink for ink-jet recording apparatuses, and surfactant and dissolution stabilizer which are optional components in the ink for ink-jet recording apparatuses of the present disclosure, as well as a method of producing the ink for ink-jet recording are explained in order below. Among the components in the ink of the present disclosure, the super-penetrating agent may contain an organic solvent; in this connection, organic solvents having an SP value, described below, of 13 or greater and less than 23 are explained as the high SP organic solvent in the following.

SP Value

The solubility parameter defined in the present disclosure, which is a value expressed by a square root of molecular cohesive energy, can be computed by a method described in "R. F. Fedors, Polymer Engineering Science, vol. 14, p. 147, 1974". Unit thereof is $(MPa)^{1/2}$ and a value at 25° C. is indicated.

[Water]

The ink for ink-jet recording apparatuses of the present disclosure is a water-based ink, and thus it necessarily contains water. The SP value of water is 23. The water in the ink is not particularly limited within a range not inhibiting the purpose of the present disclosure and water with a desired purity may be appropriately selected and employed from waters used in the production of conventional water-based inks. The content of the water in the ink for ink-jet recording apparatuses of the present disclosure is not particularly limited within a range not inhibiting the purpose of the present disclosure. The content of the water is appropriately adjusted depending on the amounts of other components used, as described later. Typically, the content of the water in the ink is preferably from 20% to 70% by mass and more preferably from 30% to 60% by mass based on the total mass of the ink.

[Pigment Dispersion]

The ink for ink-jet recording apparatuses of the present disclosure includes a pigment dispersion that contains the pigment as a colorant and the resin.

(Pigment)

The pigment in the pigment dispersion is not particularly limited within a range not inhibiting the purpose of the present disclosure, and it may be appropriately selected and used from pigments used as a colorant in conventional inks for ink-jet recording apparatuses. Specific examples of the pigment may be exemplified by yellow pigments such as C.I. pigment yellows 74, 93, 95, 109, 110, 120, 128, 138, 139, 151, 154, 155, 173, 180, 185, and 193; orange pigments such as C.I. pigment oranges 34, 36, 43, 61, 63, and 71; red pigments such as C.I. pigment reds 122 and 202; blue pigments such as C.I. pigment blues 15 and 15:3; violet pigments such as C.I. pigment violets 19, 23, and 33; and black pigments such as C.I. pigment black 7.

The amount of the pigment used in the ink for ink-jet recording apparatuses of the present disclosure is preferably from 4% to 9.5% by mass based on the total mass of the ink. When the amount of the pigment used is excessively small, it may be difficult to form images with a desired image density. On the other hand, when the amount of the pigment used is excessively large, flowability of the ink may be impaired to result in resistance to form images with a desired image density or permeability of the ink into recording media may be impaired to result in occurrence of offset.

Volume average particle diameter D50 of the pigment in the pigment dispersion is preferably from 30 nm to 200 nm and more preferably from 70 nm to 130 nm from the viewpoint of color density, hue, and ink stability. The volume average particle diameter D50 of the pigment may be controlled by adjusting a particle diameter of beads, processing time, etc. in a process of kneading the pigment and the resin. When using an ink prepared from the pigment dispersion containing a pigment having an excessively small volume average particle diameter D50, the image density of obtained images may be lower than a desired value. When using an ink prepared from the pigment dispersion containing a pigment having an excessively large volume average particle diameter D50, clogging of nozzles for ejecting the ink may occur and ejection characteristics of the ink may degrade. The volume average particle diameter D50 of the pigment can be measured using a device such as a dynamic light scattering particle size distribution analyzer (by Sysmex Co.) for a sample which is prepared by diluting the pigment dispersion to 300 times with ion-exchange water.

(Resin)

The resin in the pigment dispersion is not particularly limited within a range not inhibiting the purpose of the present disclosure, and it can be appropriately selected and used from various resins used in the production of conventional pigment dispersions. Specific examples of preferable resins may be exemplified by styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid copolymers, styrene-maleic acid-acrylic acid alkyl ester copolymers, styrene-methacrylic acid copolymers, styrene-methacrylic acid alkyl ester copolymers, styrene-maleic acid half ester copolymers, vinylnaphthalene-acrylic acid copolymers, and vinylnaphthalene-maleic acid copolymers. Among these resins, in view of easy preparation and excellent effects in dispersing pigments, preferable are styrene-acrylic resins that include a unit derived from styrene and a unit derived from acrylic acid, methacrylic acid, acrylic acid ester, or methacrylic acid ester such as styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid-acrylic acid alkyl ester copolymers, styrene-methacrylic acid copolymers, and styrene-methacrylic acid alkyl ester copolymers.

Typically, weight average molecular weight (Mw) of the resin used for preparing the pigment dispersion, which is not particularly limited within a range not inhibiting the purpose of the present disclosure, is preferably from 10,000 to 160,000. When using an ink prepared from a pigment dispersion containing a resin with an excessively small molecular mass, it is difficult to form images with a desired image density when forming images on recording media. Furthermore, strike-through may occur in recording media after forming images. When using an ink prepared from a pigment dispersion containing a resin with an excessively large molecular mass, viscosity of the ink is higher and thus the viscosity of the ink tends to further increase under an influence of a cause such as vaporization of solvent, consequently, ejection failure of the ink from nozzles is likely to occur. For this reason, it is difficult to form good images when using the ink prepared from a pigment dispersion containing the resin with an excessively large molecular mass. The molecular mass of the resin can be controlled by a conventional method to adjust polymerization conditions such as an amount of polymerization initiator used, polymerization temperature, and polymerization time when producing the resin through a polymerization reaction. The weight average molecular weight (Mw) of the resin in the pigment dispersion can be measured using gel filtration chromatography.

The acid value of the resin used in the preparation of the pigment dispersion is preferably from 150 to 300 mg KOH/g. When the acid value of the resin is excessively small, it may be difficult to disperse the pigment in the pigment dispersion to a desired level. Therefore, in cases of using an ink prepared from the pigment dispersion containing a resin of which the acid value is excessively small, it is difficult to form images with excellent colorability and chromogenic property. In cases of preparing an ink from the pigment dispersion containing a resin of which the acid value is excessively large, it is difficult to obtain an ink with excellent storage stability. The acid value of the resin can be controlled by appropriately adjusting the amount of monomers such as acrylic acid and methacrylic acid having an acidic functional group when synthesizing the resin. Specifically, the acid value of the resin can be raised by increasing the amount of monomers having an acidic functional group.

The amount of the resin used when preparing the pigment dispersion is not particularly limited within a range not inhibiting the purpose of the present disclosure. Typically, the amount of the resin used is preferably from 2% to 10% by mass based on the total mass of the pigment dispersion. In cases of using an ink of which the amount of resin used is excessively small based on the total mass of the pigment dispersion, strike-through may occur in recording media after forming images. In cases of using an ink of which the amount of resin used is excessively large based on the total mass of the pigment dispersion, it becomes difficult to spread the ink over recording media due to increase of viscosity upon penetrating and drying as described later. Consequently, images with a desired density may not be formed.

(Method of Preparing Pigment Dispersion)

The method of preparing the pigment dispersion containing the pigment and the resin is not particularly limited within a range not inhibiting the purpose of the present disclosure, and it can be appropriately selected from conventional methods. A favorable method may be exemplified by a method where the pigment and the resin are kneaded in a suitable liquid medium like water using a wet-type media disperser such as a Nano Grain Mill (by Asada Tekko), an MSC Mill (by Mitsui Mining Co.), and a Dyno Mill (by Shinmaru Enterprises Co.) to prepare the pigment dispersion. Beads with a small diameter are used in the processing where the wet-type media disperser is employed. The particle diameter of the beads is not particularly limited; typically, the particle diameter is from 0.5 mm to 1.0 mm. The material of the beads is not particularly limited, and a hard material such as zirconia may be used.

The amount of liquid medium used to prepare the pigment dispersion is not particularly limited as long as the pigment and resin can be favorably kneaded. Typically, the mass amount of liquid medium used is preferably from 1 to 10 times and more preferably from 2 to 8 times based on the total mass of the pigment and the resin.

[Super-Penetrating Agent]

The ink of the present disclosure includes the super-penetrating agent that contains at least one compound selected from the group consisting of 1,2-hexylene glycol, 2,4-diethyl-1,5-pentanediol, 2-ethyl-1,3-hexanediol, and 2-butyl-2-ethyl-1,3-propanediol. The super-penetrating agent used for the ink of the present disclosure has an SP value of 8 or greater and less than 11, which exhibits a large difference from the SP value 23 of water. For this reason, when such a super-penetrating agent is included in water-based ink, the super-penetrating agent tends to separate from the ink. The super-penetrating agent, which has separated in the ink, causes colors of the ink to become lighter colors or transparent near ink ejection holes of recording heads. Here, the super-penetrating agent can be stably dispersed into the water-based ink by including a dissolution stabilizer with a certain SP value and a high SP organic solvent into the ink.

The content of the compound selected from the group is preferably at least 90% by mass and more preferably 100% by mass based on the total mass of the super-penetrating agent.

The super-penetrating agent has a low surface tension and thus can decrease the surface tension of the ink. For this reason, when using an ink containing the super-penetrating agent, the ink is promoted to penetrate into recording media rapidly and appropriately. Accordingly, by use of the ink containing the super-penetrating agent, images with a desired image density can be formed while suppressing smear of recording media due to offset. In addition, the super-penetrating agent has a high boiling point. For this reason, volatilization of components in the ink is suppressed as for the ink containing the super-penetrating agent. Therefore, properties of the ink are unlikely to change even after the ink has not been ejected for a while from recording heads. On the other hand, when using an ink not containing the super-penetrating agent, ejection failure may not be suppressed after the ink has not been ejected for a while from recording heads and thus it may be difficult to form images with desired image quality.

The content of the super-penetrating agent in the ink is not particularly limited within a range not inhibiting the purpose of the present disclosure. The content of the super-penetrating agent in the ink is preferably from 0.25% to 2.00% by mass based on the mass of the ink. In cases of using an ink in which the content of the super-penetrating agent is excessively small, smear of recording media due to offset tends to occur since permeability of the ink into recording media is insufficient. In cases of using an ink in which the content of the super-penetrating agent is excessively large, the pigment tends to penetrate into recording media together with liquid components of the ink since permeability of the ink into recording media is excessively high. Consequently, it is difficult to form images with good image quality by using the ink containing a large amount of the super-penetrating agent.

[High SP Organic Solvent]

The SP value of the high SP organic solvent used for the ink of the present disclosure is 13 or greater and less than 23. The high SP organic solvent used for the ink of the present disclosure contains 1,3-propanediol and at least one organic solvent other than 1,3-propanediol. By essentially including 1,3-propanediol into the ink, the ink can be imparted with excellent moisture-retaining property. For this reason, ejection failure of the ink may be easily suppressed by using the ink containing 1,3-propanediol when forming images after the ink has not been ejected for a while from recording heads.

The content of 1,3-propanediol in the ink of the present disclosure is from 10% to 20% by mass based on the mass of the ink. The content of the at least one organic solvent other than 1,3-propanediol in the ink of the present disclosure is preferably at least 3% by mass based on the mass of the ink. In cases of using an ink in which the content of 1,3-propanediol is excessively small, solvents with a lower SP value like the super-penetrating agent are likely to separate since compatibility of various solvents in the ink is insufficient. For this reason, in cases of using the ink in which the content of 1,3-propanediol is excessively small, colors of ink droplets tends to become lighter colors or transparent when ejected from recording heads after the ink has not been ejected for a while from recording heads. When colors of ink droplets ejected from recording heads have become lighter colors or transparent, it is difficult to form images with desired image quality. Furthermore, since occurrence of the transparency of ink droplets results in separation of supernatant liquid in the ink, a concentration of solid content increases in portions other than the supernatant liquid and thus the ink tends to thicken. For this reason, in cases of using the ink in which the content of 1,3-propanediol is excessively small, ejection failure of the ink is likely to occur when forming images after the ink has not been ejected for a while from recording heads. In cases of using an ink in which the content of 1,3-propanediol is excessively large, viscosity of the ink tends to be high and thus ejection failure of the ink is likely to occur when forming images after the ink has not been ejected for a while from recording heads.

When the content of the at least one organic solvent other than 1,3-propanediol is at least 3% by mass, various organic solvents in the ink are likely to be sufficiently compatible each other. For this reason, in cases of using an ink in which the content of the at least one organic solvent other than 1,3-propanediol is at least 3% by mass, solvents with a lower SP value like the super-penetrating agent are suppressed from separation in the ink and thus colors of ink droplets ejected from recording heads after the ink has not been ejected for a while from recording heads are suppressed from becoming lighter colors or transparent.

The high SP organic solvent is not particularly limited as long as it is an organic solvent of which the SP value is from 13 to 23 and may be appropriately selected from conventional organic solvents within a range not inhibiting the purpose of the present disclosure. The high SP organic solvent may contain a penetrating agent, other than the super-penetrating agent, that promotes penetration of liquid components in the ink into recording media, a moisture-retaining agent that stabilizes viscosity of the ink by suppressing vaporization of liquid components from the ink, and the like.

Among the high SP organic solvents that can be used for the ink, specific examples of the at least one organic solvent other than 1,3-propanediol may be exemplified by alkylene glycols such as ethylene glycol (14.2), propylene glycol (14.8), and 1,3-butanediol (13.6); thiodiglycol (13.5); polyol ethers of glycerin (14.1); C1-C4 monoalkyl ethers of polyhydric alcohol such as diethylene glycol monobutyl ether (21.5), triethylene glycol monomethyl ether (22.1), and triethylene glycol monobutyl ether (21.1); and C6-C8 monoalkyl ethers of polyhydric alcohol, in which the values within parentheses represent an SP value. These organic solvents may be used alone or in a combination of two or more.

Among the organic solvents used for the high SP organic solvent, glycerin is preferable from the viewpoint that the ink can have good moisture-retaining property and thus viscosity of the ink can be stabilized by suppressing vaporization of liquid components from the ink. When the ink of the present disclosure contains glycerin as the high SP organic solvent, the content of glycerin is preferably from 3% to 15% by mass and more preferably from 5% to 10% by mass based on the mass of the ink. It is also preferred in this case that the content of glycerin in the ink is from 40 parts to 100 parts by mass based on 100 parts by mass of 1,3-propanediol.

Among the above-mentioned organic solvents used for the high SP organic solvent, C1-C4 monoalkyl ethers of polyhydric alcohol such as diethylene glycol monobutyl ether, triethylene glycol monomethyl ether, and triethylene glycol monobutyl ether are preferable from the viewpoint that the effect of the super-penetrating agent to improve permeability can be supported by acting as the penetrating agent other than the above-mentioned super-penetrating agent. When the permeability of the ink into recording media is enhanced only by the super-penetrating agent, the content of the super-penetrating agent becomes large in the ink. An excessively large content of the super-penetrating agent may lead to disadvantages described above. The content of C1-C4 monoalkyl ether of polyhydric alcohol is preferably from 5% to 15% by mass in the ink.

Preferably, the high SP organic solvent preferably contains a combination of 1,3-propanediol and at least one organic solvent selected from the group consisting of 1,3-butanediol, glycerin, diethylene glycol diethyl ether, and triethylene glycol monobutyl ether. A preferable combination of the high SP organic solvents may be exemplified by a combination (i) of 1,3-propanediol, glycerin, diethylene glycol diethyl ether, and triethylene glycol monobutyl ether, a combination (ii) of 1,3-propanediol, glycerin, and diethylene glycol diethyl ether, a combination (iii) of 1,3-propanediol, 1,3-butanediol, glycerin, and diethylene glycol diethyl ether, and a combination (iv) of 1,3-propanediol and glycerin. Preferably, the content of the high SP organic solvent in the ink is from 20% to 45% by mass based on the total mass of the ink.

The ink of the present disclosure contains at least two organic solvents as the high SP organic solvent; with respect to SP values in order of the at least two organic solvents in the high SP organic solvent, all of $\Delta SPs$ which are differences between SP values of the neighboring organic solvents in order of SP values are from 0.5 to 5.0 (hereinafter, two organic solvents adjacent in order of SP values are also referred to as "adjacent organic solvents"). In cases of using an ink containing the high SP organic solvents that contains a combination of organic solvents in which at least one $\Delta SPs$ is greater than 5, organic solvents with a lower SP value like the super-penetrating agent are likely to separate since compatibility of organic solvents in the ink is insufficient. The separation of the super-penetrating agent tends to cause colors of ink droplets, ejected from recording heads after the ink has not been ejected for a while from recording heads, become lighter colors or transparent, it is therefore difficult to form images with desired image quality. Since occurrence of the color-lightening or transparency of ink droplets ejected from recording heads results from separation of supernatant liquid in the ink, a concentration of solid content increases in portions other than the supernatant liquid and thus the ink tends to thicken. The thickening of the ink tends to cause ejection failure of the ink when forming images after the ink has not been ejected for a while from recording heads.

In cases of using an ink containing the high SP organic solvents that contains a combination of organic solvents in which at least one $\Delta SPs$ is less than 0.5 (for example, two organic solvents are included as the high SP organic solvent and $\Delta SP$ thereof is less than 0.5), compatibility of various organic solvents in the ink is likely to be insufficient. In this case also, colors of ink droplets, ejected from recording heads after the ink has not been ejected for a while from recording heads is likely to become lighter colors transparent, it is therefore difficult to form images with desired image quality. Among preferable combinations of the high SP organic solvents, organic solvents in the combinations (i) and (iii) are shown in ascending order of SP values, in which the values within parentheses represent an SP value.

Combination (i):
glycerin (14.1)
1,3-propanediol (14.8)
diethylene glycol diethyl ether (16.8)
triethylene glycol monobutyl ether (21.1)
Combination (iii):
1,3-butanediol (13.6)
glycerin (14.1)
1,3-propanediol (14.8)
diethylene glycol diethyl ether (16.8)
triethylene glycol monobutyl ether (21.1)

As described above, all of ISPs which are differences between SP values of the neighboring two high SP organic solvents in order of SP values are from 0.5 to 5.0 in the combinations (i) and (iii).

[Surfactant]

Preferably, the ink of the present disclosure contains a surfactant. By including the surfactant into the ink, surface tension of the ink is small and thus the ink may have excellent dispersion stability.

The surfactant to be included into the ink is not particularly limited within a range not inhibiting the purpose of the present disclosure. At least one selected from the group consisting of cationic surfactants, anionic surfactants, and nonionic surfactants can be used as the surfactant. Among these surfactants, anionic surfactants or nonionic surfactants are more preferable.

Specific examples of the cationic surfactant may be exemplified by dodecylammonium chloride, dodecylammonium bromide, dodecyltrimethyl ammonium bromide, dodecylpyridinium chloride, dodecylpyridinium bromide, and hexadecyltrimethyl ammonium bromide. Specific examples of the anionic surfactant may be exemplified by fatty acid soaps such as sodium stearate and sodium dodecanoate, sulfonic acid salts such as dodecyl sodium sulfate and sodium dodecylbenzene sulfonate, etc. Specific examples of the nonionic surfactant may be exemplified by polyoxyethylene dodecyl ether, polyoxyethylene hexadecyl ether, polyoxyethylene nonylphenyl ether, polyoxyethylene sorbitan monooleate ether, monodecanoyl sucrose, and ethylene oxide adducts of acetylenediol. These surfactants may be used in a combination of two or more.

[Dissolution Stabilizer]

Preferably, the ink of the present disclosure contains a dissolution stabilizer. The dissolution stabilizer is a component that stabilizes a state of dissolved ink by compatibilizing the components in the ink. Specific examples of the dissolution stabilizer may be exemplified by 2-pyrrolidone, N-methyl-2-pyrrolidone, and γ-butyrolactone. These dissolution stabilizers may be used in a combination of two or more. Preferably, the dissolution stabilizer in the ink of the present disclosure has an SP value of 11 or greater and less than 13. By including the dissolution stabilizer having an SP value within this range into the ink, dissolution condition of the super-penetrating agent having an SP value of 8 or greater and less than 11 and the organic solvent having an SP value of 13 or greater and less than 23 can be stabilized in the ink.

[Method of Producing Ink]

The method of producing the ink of the present disclosure is not particularly limited as long as the method is capable of uniformly mixing the components of the ink such as the pigment dispersion, water, the super-penetrating agent, and the high SP organic solvent. A specific example of the method for producing the ink for ink-jet recording apparatuses may be exemplified by a method of uniformly mixing the pigment dispersion, water, the super-penetrating agent, and the high SP organic solvent, which are essential components of the ink, and the surfactant and the dissolution stabilizer, which are optional components, by using a mixer and then removing foreign matter and coarse particles by use of a filter with a pore size of 5 μm or less. In addition, when producing the ink, various conventional additives that have been added to inks for ink-jet recording apparatuses such as anti-oxidants, viscosity modifiers, pH adjusters, and antibacterial/antifungal agents may be added thereto, as required.

It is preferred in terms of composition of the components in the ink that the pigment dispersion of from 5% to 10% by mass, the surfactant of from 0.1% to 1.0% by mass, the super-penetrating agent of from 0.1% to 1.0% by mass, the dissolution stabilizer of from 1.0% to 20.0% by mass, 1,3-propanediol as the high SP organic solvent of from 10% to 20% by mass, and at least one organic solvent other than 1,3-propanediol of from 5% to 25% by mass are included based on the total mass of the ink.

In the ink of the present disclosure, the difference of $SP_{max}$–$SP_{min}$ is 12 or less, in which $SP_{max}$ is the largest SP value of an organic solvent in the high SP organic solvent and $SP_{min}$ is the smallest SP value of an organic solvent among organic solvents in the super-penetrating agent. When $SP_{max}$–$SP_{min}$ is greater than 12, the organic solvent having the largest SP value among the organic solvents in the high SP organic solvent and the organic solvent having the smallest SP value among the organic solvents in the super-penetrating agent are resistant to dissolve each other; as a result, organic solvents with a lower SP value like the super-penetrating agent are likely to separate in the ink. Since the separation of organic solvents with a lower SP value tends to cause colors of ink droplets, ejected from recording heads after the ink has not been ejected for a while from recording heads, to become lighter colors or transparent, it becomes difficult to form images with desired image quality. Furthermore, because occurrence of the color-lightening or transparency of ink droplets ejected from recording heads results in separation of supernatant liquid in the ink, a concentration of solid content increases in portions other than the supernatant liquid and thus the ink tends to thicken. The thickening of the ink tends to cause ejection failure of the ink when forming images after the ink has not been ejected for a while from recording heads.

A preferable combination of the pigment dispersion, the surfactant, the super-penetrating agent, the dissolution stabilizer, and the high SP organic solvent may be exemplified by a combination of the pigment dispersion containing a styrene-acrylic resin, the surfactant consisting of ethylene oxide adduct of acetylenediol (OLFINE E1010), the super-penetrating agent consisting of 2,4-diethyl-1,5-pentanediol, the dissolution stabilizer consisting of 2-pyrrolidone, and the high SP organic solvent consisting of 1,3-propanediol, glycerin, diethylene glycol diethyl ether, and triethylene glycol monobutyl ether (ink composition (i)); and a combination of the pigment dispersion containing a styrene-acrylic resin, the surfactant consisting of ethylene oxide adduct of acetylenediol (OLFINE E1010), the super-penetrating agent consisting of 1,2-hexylene glycol and 2,4-diethyl-1,5-pentanediol, the dissolution stabilizer consisting of 2-pyrrolidone, and the high SP organic solvent consisting of 1,3-propanediol, 1,3-butanediol, glycerin, and diethylene glycol diethyl ether (ink composition (ii)). Hereinafter, the materials in the ink compositions (i) and (ii) are shown in ascending order of SP values, in which the values within parentheses represent an SP value.

Ink Composition (i):
OLFINE E1010 (7.0)
2,4-diethyl-1,5-pentanediol (9.8)
2-pyrrolidone (11.2)
glycerin (14.1)
1,3-propanediol (14.8)
diethylene glycol diethyl ether (16.8)
triethylene glycol monobutyl ether (21.1)

Ink Composition (ii):
OLFINE E1010 (7.0)
1,2-hexylene glycol (9.0)
2,4-diethyl-1,5-pentanediol (9.8)
2-pyrrolidone (11.2)
1,3-butanediol (13.6)
glycerin (14.1)
1,3-propanediol (14.8)
diethylene glycol diethyl ether (16.8)

In the ink composition (i), $SP_{max}$ as the largest SP value among SP values of organic solvents is 21.1 and $SP_{min}$ as the smallest SP value among SP values of organic solvents is 9.8. Therefore, the value of $SP_{max}-SP_{min}$ is 11.3. In the ink composition (ii), $SP_{max}$ is 16.8 and $SP_{min}$ is 9.0. Therefore, the value of $SP_{max}-SP_{min}$ is 7.8.

When using the ink for ink-jet recording apparatuses according to the first embodiment, ejection failure of the ink can be suppressed when forming images after the ink has not been ejected for a while from recording heads and images can be formed with desired image quality. For this reason, the ink for ink-jet recording apparatuses according to the first embodiment can be properly used in various ink-jet recording apparatuses.

Second Embodiment

The second embodiment relates to an image forming method for forming an image using the ink for ink-jet recording apparatuses according to the first embodiment by an ink-jet recording apparatus. The recording system of the ink-jet recording apparatus, used in the image forming method according to the second embodiment, is not particularly limited and may be a serial type in which recording is performed while scanning a recording head over a recording medium or a line head-type in which recording is performed using a recording head fixed to an apparatus main body. The recording system of the ink-jet recording apparatus, used in the image forming method according to the second embodiment, is preferably a line head-type from the viewpoint of higher speed in forming images.

Figure 2:
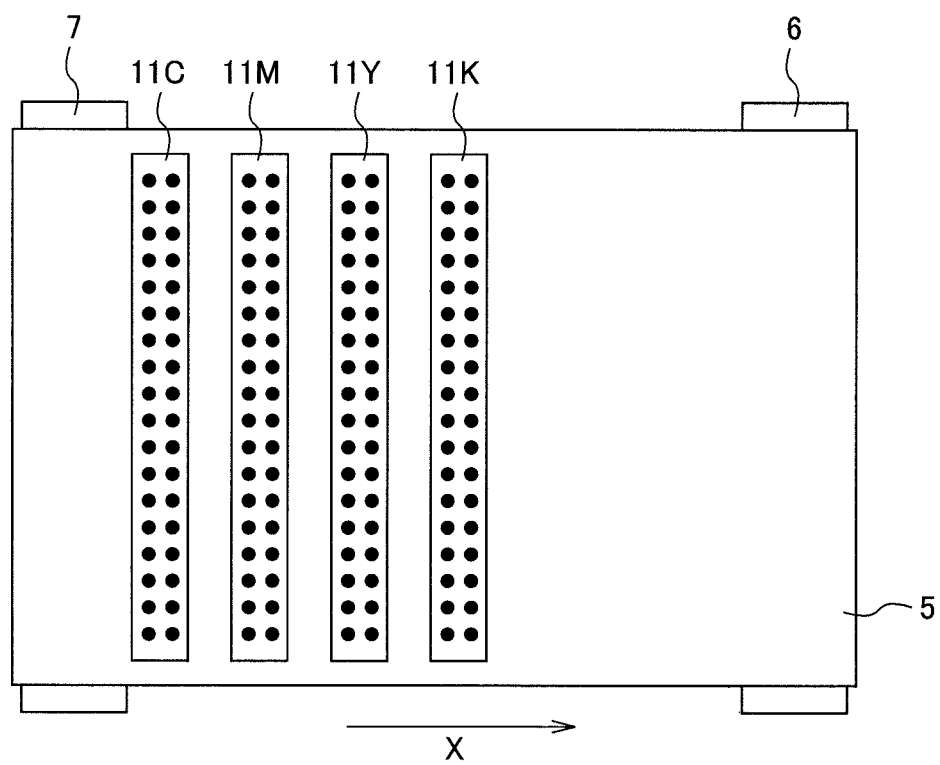
FIG. 2 is a view in which a conveyor belt of the ink-jet recording apparatus shown in FIG. 1 is viewed from above.

The image forming method of the second embodiment is explained with respect to the case of using a line head-type ink-jet recording apparatus where a recording paper is used as a recording medium with reference to figures below. FIG. 1 is a cross-sectional view showing the configuration of a line head-type ink-jet recording apparatus; and FIG. 2 is a view of a conveyor belt, of the ink-jet recording apparatus shown in FIG. 1, viewed from above.

As shown in FIG. 1, a paper feed tray 2, where a recording paper P is stored, is provided on a left side of an ink-jet recording apparatus 100; and there are provided a paper feed roller 3 that feeds and conveys an uppermost recording paper P one by one in sequence to a conveyor belt 5 and a driven roller 4 that pressure-contacts with the paper feed roller 3 and is rotationally driven, at one end of the paper feed tray 2.

The conveyor belt 5 for conveying the recording paper P is rotatably arranged at a downstream side in a paper conveying direction (right side in FIG. 1) of the paper feed roller 3 and the driven roller 4. The conveyor belt 5 is stretched over a belt drive roller 6 that is arranged and rotated at the downstream side in the paper conveying direction and a belt roller 7 that is arranged at an upstream side and driven-rotated with the belt drive roller 6 through the conveyor belt 5. The recording paper P, supported by the conveyor belt 5, is conveyed to the direction of arrow X by rotationally driving the belt drive roller 6 to the clockwise direction. Preferably, the recording paper P is conveyed at a speed of at least 50 m/min.

The belt drive roller 6 is arranged at a downstream side in the paper conveying direction X, thereby the paper feeding side (upwards in FIG. 1) of the conveyor belt 5 is pulled by the belt drive roller 6. Consequently, belt tension can be applied, and thus the recording paper P can be stably conveyed. Here, a sheet of a dielectric resin is used for the conveyor belt 5, and a belt without seams (seamless) is preferably used.

At the downstream side in the paper conveying direction X of the conveyor belt 5, there are also provided a discharge roller 8a that is driven in the clockwise direction to discharge the recording paper P with a recorded image out of the apparatus main body and a driven roller 8b that is in pressure-contact with the top of the discharge roller 8a and is rotationally driven. A paper ejection tray 10, on which the recording paper P discharged out of the apparatus main body is stacked, is also provided at the downstream side in the paper conveying direction X of the discharge roller 8a and the driven roller 8b.

Since the driven roller 8b directly contacts the image forming surface of the recording paper P, it is preferable that the material of the surface of the driven roller 8b is a water-repellent material. Adhesion of the ink, which has not penetrated into the recording paper, to the driven roller 8b can be suppressed by making the surface of the driven roller 8b from the water-repellent material. Therefore, occurrence of offset can be easily suppressed. The preferable water-repellent material may be exemplified by fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride. Similarly to the driven roller 8b, the surface of the components directly contacting the image forming surface of the recording paper P is preferably made of the water-repellent material.

Above the conveyor belt 5, there are provided line heads 11C, 11M, 11Y, and 11K which are supported at a height such that a predetermined interval is maintained from the top surface of the conveyor belt 5 and which perform recording of images on the recording paper P conveyed on the conveyor belt 5. Colored inks of four different colors (cyan, magenta, yellow, and black) are filled in these line heads 11C to 11K respectively, and color images are formed on the recording paper P by ejecting the respective color inks from each of the line heads 11C to 11K.

In order to downsize the apparatus, preferably, the period starting from the time when the ink droplets ejected from each of the line heads 11C to 11K have landed on the recording paper P until the time when the ink landing locations on the recording paper P have reached to the discharge portion 8, consisting of the discharge roller 8a and the driven roller 8b to eject the recording paper P, is within 1 second.

Furthermore, the amount of ejected ink that has been ejected from line heads and has landed on the recording paper P (hereinafter, simply referred to as "amount of landed ink") is preferably 7 g/m² or less per color and more preferably 6 g/m² or less when forming monochromatic images. When forming images by four colors (cyan, magenta, yellow, and black), the amount is preferably 28 g/m² or less and more preferably 18 g/m² or less per four colors. Rapid image formation may be allowed while suppressing the occurrence of offset in obtained images by adjusting the amount of ejected ink within this range.

As shown in FIG. 2, these line heads 11C to 11K include nozzle arrays where a plurality of nozzles are arranged in a direction perpendicular to the conveying direction (vertical direction in FIG. 2) and have a recording area of at least the width of the recording paper P, thereby allowing to form one-line images at once on the recording paper P conveyed by the conveyor belt 5.

Here, in the line head-type ink-jet recording apparatus of this embodiment, the line heads are configured to have a recording area of at least the width of the recording paper P by way of aligning a plurality of nozzles in the longitudinal direction of a long head body that is no shorter than the width of the conveyor belt 5. In this connection, the line heads may be configured such that two or more short head units, each having two or more nozzles, are aligned in the width direction of the conveyor belt 5 to record images over the entire width of the recording paper P.

Various systems may also be employed for the ink ejection system of the line heads 11C to 11K such as a piezoelectric element system for ejecting ink droplets by using pressure occurring in liquid chambers of the line heads 11C to 11K using a piezoelectric element (piezo element), a thermal ink-jet system for causing air bubbles in liquid chambers to apply pressure using a heating element to eject the ink, and the like. The ink ejection system is preferably a piezoelectric element system in which ink droplets are ejected by using pressure occurring in a liquid chamber by controlling a voltage applied to a piezoelectric element since the control of the amount of ejected ink is easy.

Figure 3:
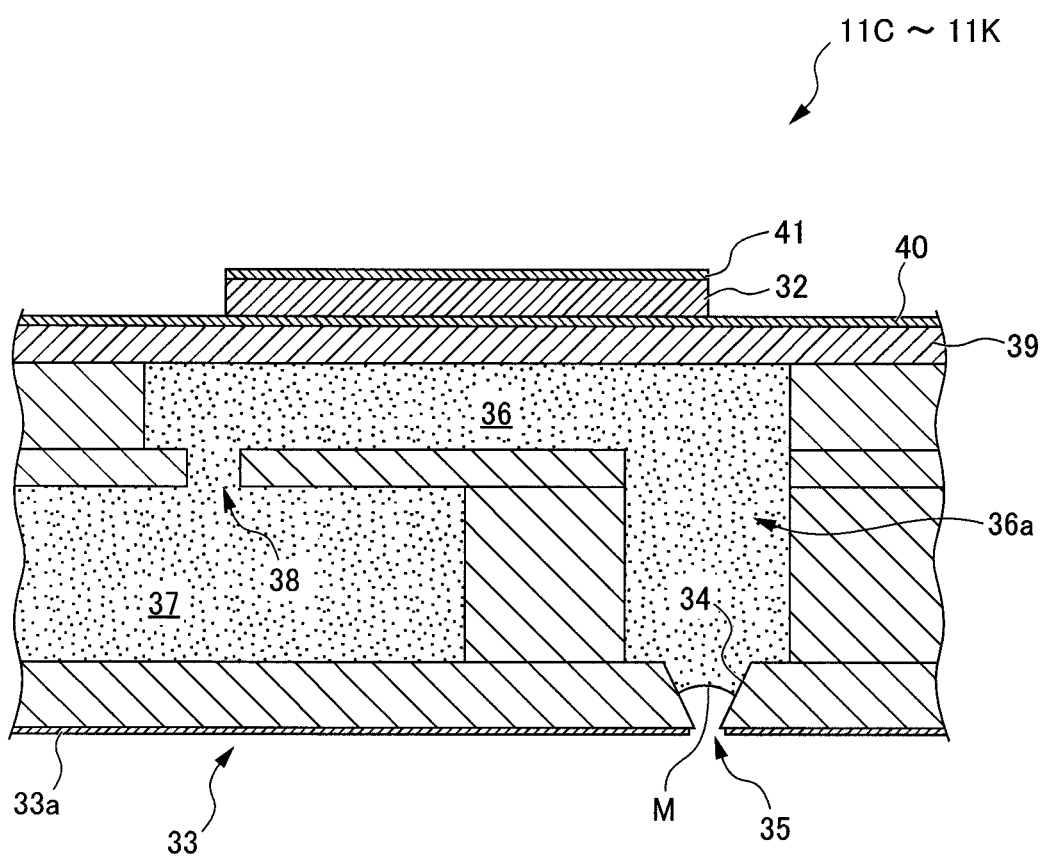
FIG. 3 is a view of a line head using a piezoelectric element system.

The line heads 11C to 11K using the piezoelectric element system are explained in detail below. FIG. 3 shows a view of the line heads 11C to 11K. As shown in FIG. 3, the line heads 11C to 11K using the piezoelectric element system may be equipped with a water-repellent film 33a that covers the portions other than the ink ejection hole 35 of an ejection surface 33, a pressure chamber 36 provided for each ink ejection hole 35, an ink bath (not shown) to reserve an ink, and a common channel 37 that supplies an ink from the ink bath to a plurality of pressure chambers 36. The pressure chamber 36 and the common channel 37 are connected by a supply hole 38, and an ink is supplied from the common channel 37 to the pressure chamber 36 through the supply hole 38.

The nozzle 34 and the pressure chamber 36 are connected by a nozzle channel 36a. The wall of the pressure chamber 36 opposite to the ejection surface 33 is formed from a vibration plate 39, and the vibration plate 39 is sequentially formed across a plurality of pressure chambers 36. A common electrode 40, similarly sequentially formed across a plurality of pressure chambers 36, is laminated on the vibration plate 39. The piezoelectric element 32 is provided on the common electrode 40 for each pressure chamber 36, and an electrode 41 is provided for each pressure chamber 36 to sandwich the piezoelectric element 32 together with the common electrode 40.

The ink is ejected from the nozzle 34 onto the recording paper P by applying an ejection signal described later, and the ink exists in the pressure chamber 36 even when ink droplets are not ejected and the ink forms a meniscus surface M near the ink ejection hole 35.

In the ink-jet recording apparatus used for the image forming method of the present disclosure, preferably, a meniscus vibration is performed in a way that the meniscus surface M formed near the ink ejection hole 35 of nozzles 34 of line heads 11C to 11K is vibrated by controlling a voltage applied to the piezoelectric element 32 at a level less than ejection. A series of steps concerning the vibration of the meniscus surface M by the meniscus vibration is explained below.

Figure 4:
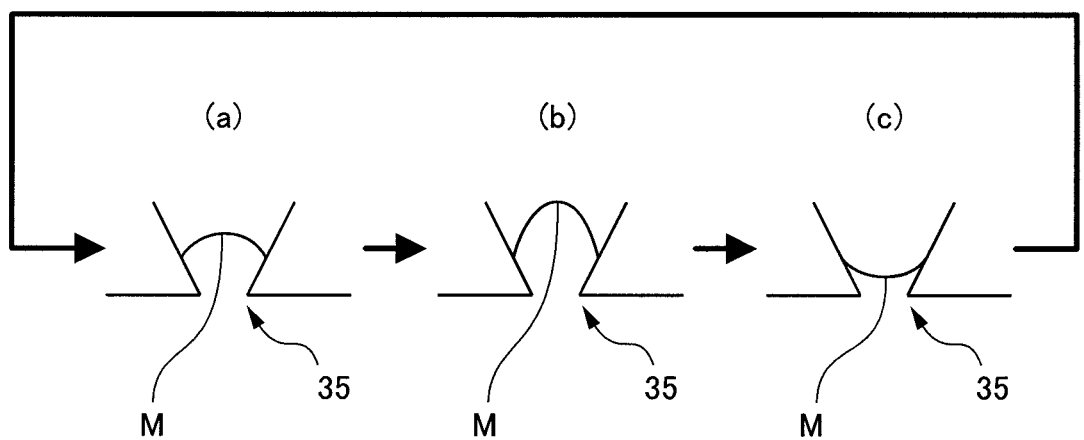
FIG. 4 shows vibrating steps of a meniscus surface under meniscus vibration.

FIG. 4 is a view showing vibrating steps of a meniscus surface M under the meniscus vibration. Initially, the meniscus surface M near the ink ejection hole 35 under a rest state as shown in the state (a) in FIG. 4 is pulled into the pressure chamber 36 by applying a drive voltage to the piezoelectric element 32 as shown in the state (b) in FIG. 4. Subsequently, application of the drive voltage is finished, then the meniscus surface M swells outward of the pressure chamber 36 as shown in the state (c) in FIG. 4 by back action of being pulled into the pressure chamber 36. In this way, the meniscus surface M vibrates without ejecting the ink, and the vibration is repeated two or more times while gradually reducing the vibration amplitude, converging into the rest state as shown in the state (a) FIG. 4. Consequently, one time of the meniscus vibration is performed on the basis of one application of the drive voltage through a series of steps as shown in the states (a) to (c) in FIG. 4 by applying once the drive voltage to the piezoelectric element 32. Here, the vibration times and the period until the meniscus surface M converges into the rest state after applying once the drive voltage to the piezoelectric element 32 depend on conditions such as viscosity and temperature of the ink. In addition, until the vibration of the meniscus surface M performed by the former application of the drive voltage converges into the rest state, fresh meniscus vibration may be started based on next application of the drive voltage.

The meniscus vibration is performed based on a control signal capable of performing the meniscus vibration (hereinafter, referred to as "meniscus vibration signal") that is transmitted from the controlling part 20 (see FIG. 5) to the line head controlling circuit 26 (see FIG. 5). When the meniscus vibration signal is applied from the controlling part 20, the line head controlling circuit 26 applies the drive voltage to perform the meniscus vibration to the piezoelectric element 32. In this way, the controlling part 20 can perform the meniscus vibration by transmitting one meniscus vibration signal. Furthermore, two or more pulses of the drive voltage applied to the piezoelectric element 32 may be included in one meniscus vibration signal; preferably, 1 to 5 pulses are included. Here, the meniscus vibration can be performed by merely changing a pulse width of the drive voltage applied to the piezoelectric element 32 using the drive circuit the same as that for ejecting ink droplets from the nozzle (see Japanese Patent No. 4,541,856, paragraph 0052). The frequency of the meniscus vibration signal transmitted from the controlling part 20 is not particularly limited, and the piezoelectric element 32 may be voltage controlled by a drive voltage of a frequency of from 10 kHz to 50 kHz.

It is also preferred that the meniscus vibration is performed at least before ink ejection. By performing the meniscus vibration before ink ejection, the ink near the ink ejection hole 35 that has not been ejected until then and thickened due to solvent evaporation and the ink in the pressure chamber 36 of the line heads 11C to 11K are stirred, thereby the ink in the pressure chamber 36 and the ink near the ink ejection hole 35 of the nozzle can be made uniform. By this action, the viscosity of the ink near the ink ejection hole 35 can be reduced, thus ejection failure of the ink can be suppressed when forming images after the ink has not been ejected for a while from line heads 11C to 11K. Furthermore, the ink in the pressure chamber 36 and the ink near the ink ejection hole 35 of the nozzle 34 can be made uniform, thereby problems in that colors of the ink near the ink ejection hole 35 become lighter colors or transparent can be eliminated, and thus images with desired image quality can be formed when forming images after the ink has not been ejected for a while from line heads 11C to 11K.

More specifically, the meniscus vibration is preferably performed one or more times before forming an image on the recording paper P (while all line heads 11C to 11K do not eject the ink) and/or just before the ink ejection. When the meniscus vibration is performed before forming an image on the recording paper P, the meniscus vibration signal is preferably applied from 300 to 2,000 times in series. On the other hand, when the meniscus vibration is performed just before the ink ejection, the meniscus vibration signal is preferably applied from 10 to 500 times and more preferably from 50 to 300 times in series. Here, in regards to the meniscus vibration before forming an image on the recording paper P and the meniscus vibration just before the ink ejection, either of both may be performed or both may be performed. The vibration of meniscus surface M of the ink on the basis of one application of meniscus vibration signal is explained as one meniscus vibration. Specifically, performance of 400 times of meniscus vibration in Examples described later means that the meniscus vibration signal is applied 400 times. Furthermore, when the meniscus vibration is performed before forming an image on the recording paper P and/or just before the ink ejection, the meniscus vibration signal can be transmitted together with the control signal for image formation that is transmitted from the controlling part 20 to the line head controlling circuit 26.

Here, the ink thickening that occurs near the ink ejection hole 35 happens from the fact that the solvent in the ink volatilizes from the meniscus surface M, and the amount of volatilizing solvent is reduced as the volatilization of the solvent from the meniscus surface M progresses. Therefore, when the meniscus vibration is excessively performed, the ink tends to be entirely thickened. For this reason, when images are formed sequentially on two or more recording paper P and the meniscus vibration is performed before forming an image on the recording paper P, preferably, the meniscus vibration is performed only before forming an image on the first recording paper P when forming images sequentially. By this way, the thickening of entire ink caused by excessively performing the meniscus vibration can be suppressed and ejection failure of the ink can be suppressed when forming images.

Figure 5:
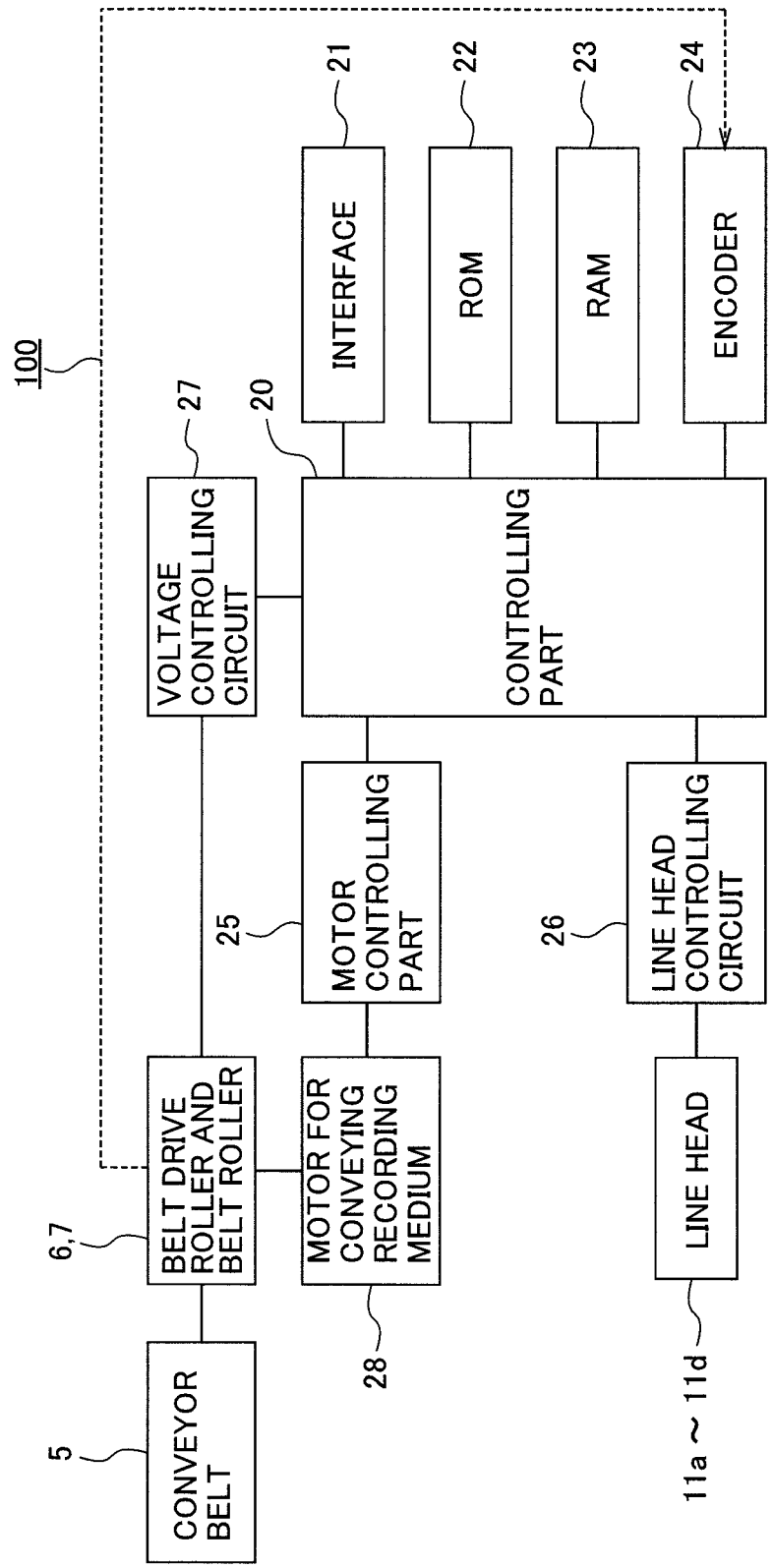
FIG. 5 is a block view showing a configuration of a line head-type ink-jet recording apparatus.

FIG. 5 is a block view showing a configuration of an ink-jet recording apparatus that employs a line head-type recording system. The portions common between FIG. 1 and FIG. 2 are marked with an identical symbol and duplicated explanations thereof are omitted. The ink-jet recording apparatus 100 is equipped with a controlling part 20, and an interface 21, a ROM 22, a RAM 23, an encoder 24, a motor controlling circuit 25, a line head controlling circuit 26, and a voltage controlling circuit 27 are connected to the controlling part 20.

The interface 21 transmits and receives data between a host device such as a personal computer (not shown). The controlling part 20 converts an image signal received via the interface 21 into image data by conducting magnification-changing processing or gradation processing as required. Then control signals are output to various controlling circuits described later. When the meniscus vibration is performed, the controlling part 20 outputs the meniscus vibration signal to the line head controlling circuit 26 and the voltage applied to the piezoelectric element 32 is controlled based on the output signal, thereby the meniscus vibration can be performed such that the ink meniscuses formed near the ink ejection holes 35 of two or more nozzles of the line heads 11C to 11K are vibrated one or more times at a level less than ejection.

The ROM 22 stores a program such as a control program for forming an image by driving the line heads 11C to 11K. The RAM 23 stores image data, having been magnification-changing processed or gradation processed by the controlling part 20, in a predetermined region.

The encoder 24 is connected to the belt drive roller 6 on a paper ejection side of driving the conveyor belt 5, and outputs a pulse train depending on the rotational displacement amount of the rotation axis of the belt drive roller 6. The controlling part 20 calculates the amount of rotation by counting the number of pulses sent from the encoder 24 to confirm the feed amount of the recording paper P (position of recording paper P). The controlling part 20 outputs a control signal to the motor controlling circuit 25 and line head controlling circuit 26 based on the signal from the encoder 24.

The motor controlling circuit 25 drives a motor for conveying recording medium 28 based on the output signal from the controlling part 20. The belt drive roller 6 is rotated by driving the motor for conveying recording medium 28, and the conveyor belt 5 is rotated in the clockwise direction of FIG. 1 to convey the recording paper P to the direction of arrow X. At this time, as described above, it is preferred that the controlling part 20 controls the voltage onto the motor for conveying recording medium 28 to rotationally drive the belt drive roller 6 such that the recording paper P is conveyed at a speed of at least 50 m/min.

The line head controlling circuit 26 transfers image data stored in the RAM 23 to the line heads 11C to ilk based on the output signal from the controlling part 20, and controls the ink ejection from the line heads 11C to 11K based on the transferred image data. Image formation on the recording paper P is performed according to the control described above as well as the conveyance control of the recording paper P through the conveyor belt 5 driven by the motor for conveying recording medium 28. Furthermore, when the meniscus vibration described above is performed, the line head controlling circuit 26 controls the meniscus vibration of the line heads 11C to 11K based on the output signal from the controlling part 20.

The voltage controlling circuit 27 produces an alternating electric field by applying a voltage to the belt roller 7 on the paper feed side based on the output signal from the controlling part 20, thereby statically attracting the recording paper P to the conveyor belt 5. The static attraction is released by grounding the belt roller 7 or belt drive roller 6 based on the output signal from the controlling part 20. Here, the voltage is applied to the belt roller 7 on the paper feed side, but the voltage may be applied to the belt drive roller 6 on the paper ejection side.

The method of forming dots using the line head-type ink-jet recording apparatus is specifically explained with reference to FIG. 6. Among the line heads 11C to 11K shown in FIGS. 1 and 2, the line head 11C is explained as an example with reference to FIG. 6; and other line heads 11M to 11K can be explained fairly similarly thereto.

Figure 6:
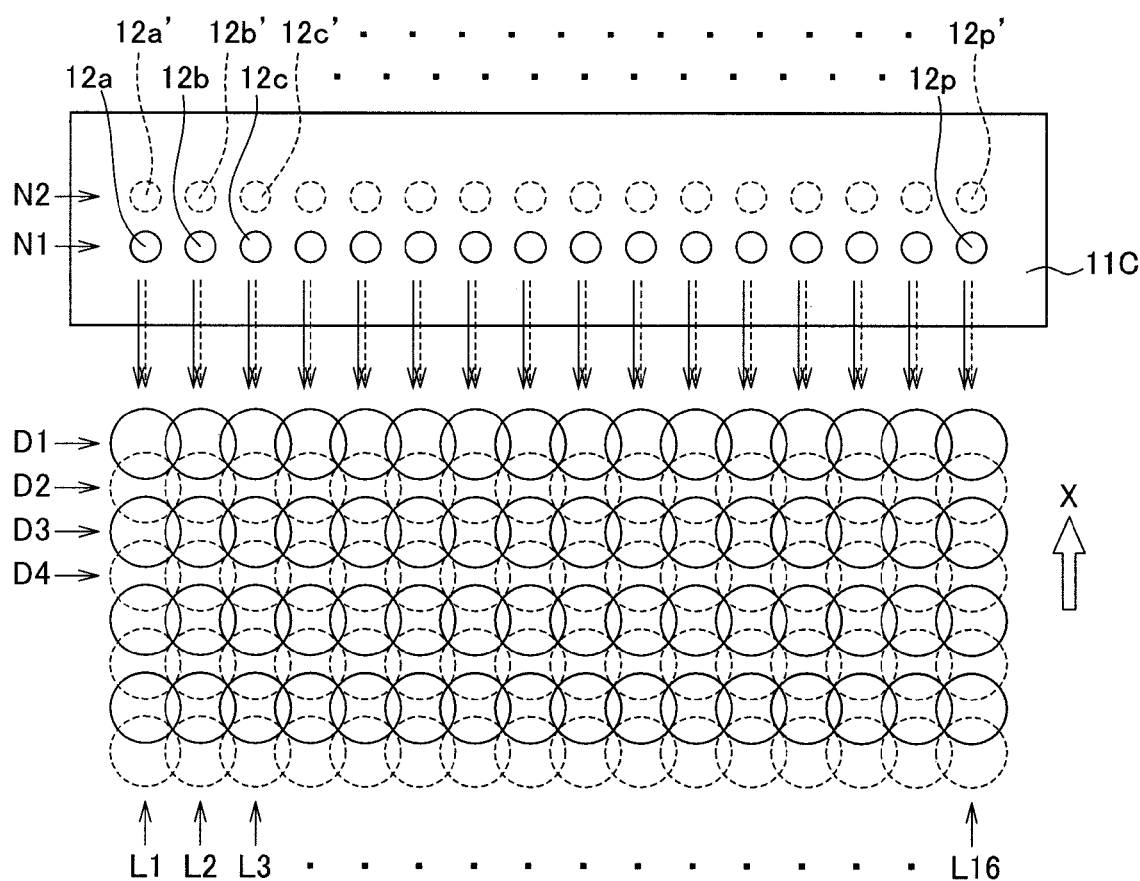
FIG. 6 is a view showing a line head used in a line head-type ink-jet recording apparatus and a part of dot lines formed on a recording paper.

As shown in FIG. 6, in the line head 11C, the nozzle arrays N1 and N2 consisting of a plurality of nozzles are arranged in parallel to the direction of conveying the recording paper P (direction of arrow X). That is, a total of two nozzles are provided to each of the nozzle arrays N1 and N2 (nozzles 12*a* and 12*a*' corresponding to a dot array L1) as the nozzles that form dot arrays in the conveying direction X of the recording paper P. Here, for convenience of explanation, only the 16 nozzles of 12*a* to 12*p* and 12*a*' to 12*p*' corresponding to the dot arrays L1 to L16 are illustrated among the nozzles of the nozzle arrays N1 and N2; actually, still more nozzles are arranged in a direction perpendicular to the paper conveying direction X.

Images are formed on the recording paper P as a recording medium using the nozzle arrays N1 and N2 in series. After forming the dot array D1 of one line in the width direction (left-right direction in FIG. 6) of the recording paper P by ejecting ink droplets from the nozzle array N1 (solid arrow in FIG. 6) while moving the recording paper P in the conveying direction X, a subsequent dot array D2 of one line is formed by ejecting ink droplets from the nozzle array N2 (dotted arrow in FIG. 6), and then a subsequent dot array D3 of one line is further formed by ejecting ink droplets from the nozzle array N1. Thereafter, dot arrays D4 and the following are similarly formed by alternately using the nozzle arrays N1 and N2.

The above-mentioned image forming method according to the second embodiment employs the ink according to the first embodiment; therefore, ejection failure of the ink can be suppressed when forming images after the ink has not been ejected for a while from recording heads and images can be formed with desired image quality. For this reason, the image forming method according to the second embodiment can be properly used in various ink-jet recording apparatuses.

EXAMPLES

The present disclosure is explained more specifically with reference to examples below. In addition, the present disclosure is not limited to the examples.

Preparation Example 1

(Preparation of Styrene-Acrylic Resin)

A styrene-acrylic resin used for preparation of pigment dispersion was prepared using a macromonomer synthesis process. Specifically, an oligomer in which a (meth)acryloyl group bound to one end of polystyrene molecule (AS-6, by Toagosei Co., number average molecular mass (Mn): 6,000) and predetermined amounts of methacrylic acid, methyl methacrylate, and butyl methacrylate were polymerized in methyl ethyl ketone in the presence of a polymerization initiator of 2,2'-azobis(2,4-dimethylvaleronitrile), thereby preparing the styrene-acrylic resin. Weight average molecular weight (Mw) of the obtained resin was determined in accordance with the following conditions using gel filtration chromatography (HLC-8020GPC, by Tosoh Co.). Acid value (mg KOH/g) of the obtained resin was also determined by titration. The weight average molecular weight (Mw) of the obtained resin was about 50,000 and the acid value was 150.
Measurement Conditions of Weight Average Molecular Weight
Column: TSKgel, Super Multipore HZ-H (4.6 mm ID×15 cm, by Tosoh Co.)
Number of columns: 3
Eluent: tetrahydrofuran
Flow rate: 0.35 mL/min
Amount of injected sample: 10 μL
Measurement temperature: 40° C.
Detector: IR detector A calibration curve was prepared on the basis of 8 types of F-40, F-20, F-4, F-1, A-5000, A-2500, A-1000, and n-propylbenzene selected from reference standards (TSK standard, polystyrene, by Tosoh Co.).

Preparation Example 2

(Preparation of Pigment Dispersion)

P.B-15:3 was used as a cyan pigment. 15% by mass of the pigment, 10% by mass of the styrene-acrylic resins obtained in Preparation Example 1, and 0.5% by mass of a surfactant (OLFINE E1010, ethylene oxide adduct of acetylenediol, by Nissin Chemical Industry Co.) based on the total mass of components used in the preparation of the pigment dispersion, and also the remaining water were introduced into a Dyno Mill (Multilabo, vessel volume 0.6 L, by Shinmaru Enterprises Co.). Next, potassium hydroxide of an amount necessary to neutralize the styrene-acrylic resin was added to the Dyno Mill. Then, zirconia beads with a diameter of 0.5 mm as a media equivalent to the 70% by volume of the vessel volume were filled into the Dyno Mill, and the pigment and the styrene-acrylic resin were kneaded under the conditions of 10° C., circumferential velocity 8 m/s, and water-cooling, thereby obtaining the pigment dispersion. The obtained pigment dispersion was diluted to 300 times with ion exchange water, and the volume average particle diameter D50 of the pigment was measured by a dynamic light scattering-type particle size distribution analyzer (Zetasizer Nano, by Sysmex Co.); as a result, the volume average particle diameter D50 of the pigment was confirmed to be within a range of from 70 nm to 130 nm.

Examples 1 to 4 and Comparative Examples 1 to 8

6% by mass of the pigment dispersion obtained in Preparation Example 2, 0.5% by mass of OLFINE E1010 (surfactant, ethylene oxide adduct of acetylenediol, by Nissin Chemical Industry Co.), 10% by mass of 2-pyrrolidone (dissolution stabilizer), and the contents shown in Tables 1 and 2 of 1,2-hexylene glycol (super-penetrating agent), 2,4-diethyl-1,5-pentanediol (super-penetrating agent), 1,3-butanediol (high SP organic solvent), glycerin (high SP organic solvent), 1,3-propanediol (high SP organic solvent), diethylene glycol diethyl ether (high SP organic solvent), triethylene glycol monomethyl ether (high SP organic solvent), and triethylene glycol monobutyl ether (high SP organic solvent), and also the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 1 to 4 and Comparative Examples 1 to 8. Here, SP values of the compounds in the inks are shown in Tables 1 and 2; and the compounds in Tables 1 and 2 are expressed by abbreviated names as shown below.
2,4-diethyl-1,5-pentanediol: DEPG
diethylene glycol diethyl ether: DEGDEE
triethylene glycol monomethyl ether: TEGMME
triethylene glycol monobutyl ether: TEGMBE

TABLE 1

|  | SP value | Example | | | |
|---|---|---|---|---|---|
|  |  | 1 | 2 | 3 | 4 |
| 1,2-Hexyleneglycol (% by mass) | 9.0 | — | — | 0.25 | — |
| DEPG (% by mass) | 9.8 | 0.5 | 0.5 | 0.25 | 0.5 |
| 1,3-Butanediol (% by mass) | 13.6 | — | — | 5 | — |

TABLE 1-continued

| | SP value | Example 1 | Example 2 | Example 3 | Example 4 |
|---|---|---|---|---|---|
| Glycerin (% by mass) | 14.1 | 9 | 9 | 9 | 5 |
| 1,3-Propanediol (% by mass) | 14.8 | 19 | 10 | 19 | 19 |
| DEGDEE (% by mass) | 16.8 | 5 | 10 | 10 | — |
| TEGMBE (% by mass) | 21.1 | 10 | — | — | — |
| Maximum value of ΔSP | — | 4.3 | 2.0 | 2.0 | 0.7 |
| $SP_{max} - SP_{min}$ | — | 11.3 | 7.0 | 7.8 | 5.0 |

TABLE 2

| | SP value | Comp. 1 | Comp. 2 | Comp. 3 | Comp. 4 | Comp. 5 | Comp. 6 | Comp. 7 | Comp. 8 |
|---|---|---|---|---|---|---|---|---|---|
| 1,2-Hexyleneglycol (% by mass) | 9.0 | — | 0.25 | — | — | — | — | — | — |
| DEPG (% by mass) | 9.8 | — | 0.25 | 0.5 | 0.5 | 0.5 | 0.5 | — | 0.5 |
| 1,3-Butanediol (% by mass) | 13.6 | — | — | — | — | — | — | — | — |
| Glycerin (% by mass) | 14.1 | 9 | 9 | 9 | 15 | 9 | — | — | — |
| 1,3-Propanediol (% by mass) | 14.8 | 19 | 19 | 19 | 5 | 25 | 19 | 19 | 19 |
| DEGDEE (% by mass) | 16.8 | 20 | 5 | — | 10 | 5 | — | 5 | — |
| TEGMBE (% by mass) | 21.1 | — | 5 | 10 | — | 5 | — | 10 | — |
| TEGMME (% by mass) | 22.1 | — | — | — | — | — | 10 | — | — |
| Maximum value of ΔSP | — | 2.0 | 4.3 | 6.3 | 2.0 | 4.3 | 7.3 | 4.3 | — |
| $SP_{max} - SP_{min}$ | — | — | 12.1 | 11.3 | 7.0 | 11.3 | 12.3 | — | — |

Evaluation

Intermittent ejection property was evaluated for the obtained inks of Examples 1 to 4 and Comparative Examples 1 to 8 in accordance with the method below. Evaluation results of the intermittent ejection property are shown in Table 3.

Method of Evaluating Intermittent Ejection Property

A device for evaluating ejection of ink-jet printer units (piezo head type, 2656 nozzles per head, droplet amount per ejection: 15 pL, drive frequency: 20 kHz) was used as an evaluation device. The intermittent ejection property was evaluated at a paper feed speed of 840 m/sec under an environment of 10° C. and 15% RH. A glossy paper (KA4100PGP, by Epson Co.) was used as a recording medium. Specifically, after 5, 10, and 30 seconds elapsed form the time when a solid image of 300×300 dots was formed on the recording medium, a line image of one dot and one line was formed along a conveying direction of the recording medium. A line image of one dot and one line was formed immediately after printing the solid image, and the intermittent ejection property was evaluated with reference to the line image of one dot and one line using a microscope by observing density and position of a dot which had been initially dropped on the line image formed respectively after the predetermined time of 5, 10, and 30 seconds. Evaluation criteria of the intermittent ejection property are shown below.

(Dot Density)

Evaluation of density and color hue of dots in the line image gives an indication of whether or not an image with desired image quality has formed. In the evaluation of dot density, very good or good was deemed to be OK and bad or very bad was deemed to be NG.

Very good: dots could be formed with density and color hue which were not different from those of the line image formed immediately after printing the solid image;

Good: dots with good density could be formed although density and color hue were different from those of the line image formed immediately after printing the solid image;

Bad: there exist dots of which color is light and outline is unclear compared to those of the line image formed immediately after printing the solid image; and Very bad: dots are transparent and illegible.

(Dot Position)

Evaluation of dot position in the line image gives an indication of resistance to cause ejection failure. In evaluating the dot position, evaluation of good was deemed to be OK and evaluation of bad or very bad was deemed to be NG.

Good: no shift of dot position;

Bad: slight shift of dot position; and

Very bad: clear shift of dot position.

TABLE 3

| | 5 seconds | | 10 seconds | | 30 seconds | |
|---|---|---|---|---|---|---|
| | Dot density | Dot position | Dot density | Dot position | Dot density | Dot position |
| Ex. 1 | Very good | Good | Very good | Good | Good | Good |
| Ex. 2 | Very good | Good | Very good | Good | Good | Good |
| Ex. 3 | Very good | Good | Very good | Good | Good | Good |
| Ex. 4 | Very good | Good | Very good | Good | Very good | Good |
| Comp. ex. 1 | Good | Good | Bad | Bad | Very bad | Very bad |
| Comp. ex. 2 | Good | Good | Bad | Bad | Very bad | Very bad |
| Comp. ex. 3 | Bad | Bad | Bad | Bad | Very bad | Very bad |
| Comp. ex. 4 | Good | Very bad | Bad | Very bad | Bad | Very bad |
| Comp. ex. 5 | Very good | Good | Very good | Good | Good | Bad |

TABLE 3-continued

|  | 5 seconds | | 10 seconds | | 30 seconds | |
| --- | --- | --- | --- | --- | --- | --- |
|  | Dot density | Dot position | Dot density | Dot position | Dot density | Dot position |
| Comp. ex. 6 | Bad | Bad | Bad | Very bad | Very bad | Good |
| Comp. ex. 7 | Bad | Bad | Bad | Very bad | Very Bad | Very bad |
| Comp. ex. 8 | Bad | Bad | Very bad | Very bad | Very bad | Very bad |

It is understood from Table 3 that ejection failure of the ink can be suppressed when forming images after the ink has not been ejected for a while from recording heads and images with desired image quality can be formed in the cases of using the inks of Examples 1 to 4 that contain water, the pigment dispersion, and the super-penetrating agent and the high SP organic solvent respectively having a predetermined solubility parameter, in which the super-penetrating agent contains at least one compound selected from the group consisting of 1,2-hexylene glycol, 2,4-diethyl-1,5-pentanediol, 2-ethyl-1,3-hexanediol, and 2-butyl-2-ethyl-1,3-propanediol, the high SP organic solvent contains 1,3-propanediol and at least one organic solvent other than 1,3-propanediol, the content of 1,3-propanediol is from 10% to 20% by mass based on the mass of the ink, all of differences (ISPs) between SP values of the neighboring organic solvents are from 0.5 to 5.0 in order of SP values thereof, and the difference of $SP_{max}-SP_{min}$ is 12 or less in which $SP_{max}$ is the highest SP value of an organic solvent among organic solvents in the high SP organic solvent and $SP_{min}$ is the smallest SP value of an organic solvent among organic solvents in the super-penetrating agent.

On the other hand, in the cases of using the inks of Comparative Examples 1 and 2 where the inks do not contain at least one compound selected from the group consisting of 1,2-hexylene glycol, 2,4-diethyl-1,5-pentanediol, 2-ethyl-1,3-hexanediol, and 2-butyl-2-ethyl-1,3-propanediol as the super-penetrating agent, ejection failure was likely to occur when forming images after the inks had not been ejected for a while from recording heads and also colors of ink droplets, ejected from recording heads after the inks had not been ejected for a while from the recording heads, were likely to become lighter colors or transparent. The reason is believed that various organic solvents in the inks were resistant to dissolve each other.

In the cases of using the inks of Comparative Examples 2 and 6 where the difference of $SP_{max}-SP_{min}$ is greater than 12 in which $SP_{max}$ is the highest SP value of an organic solvent among organic solvents in the high SP organic solvent and $SP_{min}$ is the smallest SP value of an organic solvent among organic solvents in the super-penetrating agent, ejection failure was likely to occur when forming images after the inks had not been ejected for a while from recording heads and also colors of ink droplets, ejected from recording heads after the inks had not been ejected for a while from the recording heads were likely to become lighter colors or transparent. The reason is believed that the super-penetrating agent and the high SP organic solvent were resistant to dissolve each other and the super-penetrating agent was likely to separate in the ink.

In the cases of using the inks of Comparative Examples 3 and 6 that include the high SP organic solvent containing a combination of organic solvents where one or more ΔSP is greater than 5, in which ΔSP is the difference of SP values of the neighboring organic solvents in order of the SP values thereof, ejection failure was likely to occur when forming images after the inks had not been ejected for a while from recording heads and also colors of ink droplets ejected from recording heads after the inks had not been ejected for a while from the recording heads were likely to become lighter colors or transparent. The reason is believed that various organic solvents in the inks were resistant to dissolve each other.

In the case of using the ink of Comparative Example 4 where the content of 1,3-propanediol is less than 10% by mass, ejection failure was likely to occur when forming images after the ink had not been ejected for a while from recording heads and also colors of ink droplets ejected from recording heads after the ink had not been ejected for a while from the recording heads were likely to become lighter colors or transparent. The reason is believed that the super-penetrating agent and the high SP organic solvent were resistant to dissolve each other and the super-penetrating agent was likely to separate in the ink.

In the case of using the ink of Comparative Example 5 where the content of 1,3-propanediol is greater than 20% by mass, ejection failure was likely to occur when forming images after the ink had not been ejected for a while from recording heads. The reason is believed that the ink has thickened due to evaporation of solvents from the ink after the ink had not been ejected for a while from recording heads.

In the case of using the ink of Comparative Example 8 that does not contain at least one organic solvent other than 1,3-propanediol with respect to the high SP organic solvent in the ink, ejection failure was likely to occur when forming images after the ink had not been ejected for a while from recording heads and also colors of ink droplets ejected from recording heads after the ink had not been ejected for a while from the recording heads were likely to become lighter colors or transparent. The reason is believed that various organic solvents in the ink were resistant to dissolve each other.

Reference Examples 1 to 12

The obtained 12 types of the inks of Examples 1 to 4 and Comparative Examples 1 to 8 were evaluated for intermittent ejection property after meniscus vibration in accordance with the method below. Table 4 shows the evaluation results of the intermittent ejection property after meniscus vibration.

Evaluation of Intermittent Ejection Property after Meniscus Vibration

An evaluation device of piezoelectric element system capable of performing the meniscus vibration was used as the evaluation device. A line image was formed on a recording medium in accordance with an evaluation method similar to the evaluation method of the intermittent ejection property described above, then 1000 times of meniscus vibration was induced at a nozzle surface of the evaluation device, followed by forming the same line image after 5, 10, and 30 seconds elapsed after meniscus vibrations. The intermittent ejection property after performing 1000 times of meniscus vibration was evaluated on the basis of evaluation criteria similar to those of the intermittent ejection described above.

TABLE 4

|  | 5 seconds | | 10 seconds | | 30 seconds | |
| --- | --- | --- | --- | --- | --- | --- |
|  | Dot density | Dot position | Dot density | Dot position | Dot density | Dot position |
| Ref. ex. 1 | Very good | Good | Very good | Good | Very good | Good |

TABLE 4-continued

|  | 5 seconds | | 10 seconds | | 30 seconds | |
| --- | --- | --- | --- | --- | --- | --- |
|  | Dot density | Dot position | Dot density | Dot position | Dot density | Dot position |
| Ref. ex. 2 | Very good | Good | Very good | Good | Very good | Good |
| Ref. ex. 3 | Very good | Good | Very good | Good | Very good | Good |
| Ref. ex. 4 | Very good | Good | Very good | Good | Very good | Good |
| Ref. ex. 5 | Very good | Good | Good | Bad | Bad | Bad |
| Ref. ex. 6 | Very good | Good | Good | Bad | Bad | Bad |
| Ref. ex. 7 | Good | Good | Good | Bad | Very bad | Very bad |
| Ref. ex. 8 | Good | Very bad | Good | Very bad | Bad | Very bad |
| Ref. ex. 9 | Very good | Good | Very good | Good | Good | Bad |
| Ref. ex. 10 | Very good | Good | Very good | Good | Very good | Good |
| Ref. ex. 11 | Good | Bad | Bad | Very bad | Very bad | Very bad |
| Ref. ex. 12 | Bad | Bad | Bad | Very bad | Very bad | Very bad |

It is understood from Table 4 that, in the inks of Reference Examples 1 to 3 and 10 which are respectively the inks of Examples 1 to 3 and Comparative Example 6 after performing the meniscus vibration, images with desired image quality could be formed when forming images after the inks had not been ejected for a while from line heads 11C to 11K, since the ink in the pressure chamber 36 and the ink near the ink ejection hole 35 of the nozzle 34 could be made uniform and thus becoming lighter colors or transparent of colors of the ink near the ink ejection hole 35 could be eliminated. It is also understood that, in the inks of Reference Examples 5 and 6 which are respectively the inks of Comparative Examples 1 and 2 after performing the meniscus vibration, injection failure of the inks could be improved when forming images after the inks had not been ejected for a while from line heads 11C to 11K, since the ink in the pressure chambers 36 and the ink near the ink ejection holes 35 of nozzles could be made uniform and thus viscosity of the ink near the ink ejection holes 35 could be reduced.

What is claimed is:

1. An ink for an ink-jet recording apparatus, comprising water, a pigment dispersion, a super-penetrating agent, and a high SP organic solvent, wherein
    the super-penetrating agent comprises at least one compound selected from the group consisting of 1,2-hexylene glycol, 2,4-diethyl-1,5-pentanediol, 2-ethyl-1,3-hexanediol, and 2-butyl-2-ethyl-1,3-propanediol,
    the high SP organic solvent is an organic solvent having an SP value of 13 or greter and less than 23 and comprises at least 1,3-propanediol, glycerin and diethylene glycol diethyl ether,
    a content of 1,3-propanediol is from 10% to 20% by mass based on a mass of the ink,
    all of ΔSPs which are differences between SP values of neighboring organic solvents in order of SP values thereof are from 0.5 to 5.0, and
    difference of $SP_{max}$–$SP_{min}$ is 12 or less, in which $SP_{max}$ is the highest SP value of an organic solvent among organic solvents in the high SP organic solvent and $SP_{min}$ is the smallest SP value of an organic solvent among organic solvents in the super-penetrating agent.

2. The ink for an ink-jet recording apparatus according to claim 1, wherein a content of the super-penetrating agent is from 0.25% to 2.00% by mass based on the mass of the ink.

3. The ink for an ink-jet recording apparatus according to claim 1, wherein a content of the organic solvents other than 1,3-propanediol contained in the ink as the high SP organic solvent is 3% by mass or higher based on the mass of the ink.

4. The ink for an ink-jet recording apparatus according to claim 1, comprising 2,4-diethyl-1,5-pentanediol as the super-penetrating agent,
    2-pyrrolidone as a dissolution stabilizer, and
    glycerin, 1,3-propanediol, diethylene glycol diethyl ether, and triethylene glycol monobutyl ether as the high SP organic solvent.

5. The ink for an ink-jet recording apparatus according to claim 1, comprising 1,2-hexylene glycol and 2,4-diethyl-1,5-pentanediol as the super-penetrating agent,
    2-pyrrolidone as a dissolution stabilizer, and
    1,3-butanediol, glycerin, 1,3-propanediol, and diethylene glycol diethyl ether as the high SP organic solvent.

6. A method of forming an image comprising:
    providing the ink according to claim 1 to an ink-jet recording apparatus; and
    forming the image with the ink-jet recording apparatus using the ink.

7. The method according to claim 6, wherein the ink-jet recording apparatus comprises a recording head which ejects droplets of the ink as a result of a pressure occurring in a liquid chamber by controlling a voltage applied to a piezoelectric element, and a recording system is a line head-type recording system,
    a controller of the ink-jet recording apparatus performs a meniscus vibration such that an ink meniscus near an ink ejection hole is vibrated one or more times at a level less than ejection by controlling the voltage applied to the piezoelectric element, and
    the meniscus vibration is performed before ejecting the ink to recording media.

8. The method according to claim 7, wherein the meniscus vibration is performed from 300 to 2,000 times before forming an image on the recording media.

* * * * *